United States Patent Office 3,227,937
Patented Jan. 4, 1966

3,227,937
RECTIFIER CONTROL OF INDUCTION MOTOR SECONDARY IMPEDANCE
Floris Koppelmann, Berlin-Siemensstadt, and Karl Steimel, Konigstein-Johanneswald, Taunus, Germany, assignors to Licentia Patent-Verwaltungs-G.m.b.H., Frankfurt am Main, Germany
Filed Nov. 13, 1962, Ser. No. 236,868
Claims priority, application Germany, Nov. 15, 1961, L 40,476
7 Claims. (Cl. 318—237)

The present invention relates, generally, to asynchronous motors.

The rotational speed of an asynchronous motor can be influenced by resistances in the rotor circuit. However, the speed at which the motor is adjusted to rotate will then depend to a large extent on the rotational moment prevailing at the motor shaft at any given time. In order to obtain particular rotational speeds with given external torque conditions, it has heretofore been customary to connect the resistances into the rotor circuit in any suitable manner, as, for example, by switching the resistances into the circuit in a stepwise manner by means of protective relays. In other motor control systems, the current coming from the rotor winding is first rectified and then passed through a resistor, in which case a voltage produced from another voltage source is applied in opposition. The value of the resistances remains substantially unchanged.

The present invention relates to a method for controlling or regulating the rotational speed of asynchronous motors having slip rings, in which the rotor voltage is rectified and applied to a resistor having a fixed ohmic resistance. While the term "controlling" technically may be construed to mean selectively setting the rotational speed to any one of a plurality of different values and the term "regulating" may be construed to mean keeping the rotational speed of the motor constant at one desired value, the two terms will hereinafter be used interchangeably.

According to the invention, the amplitude of the direct current is controlled or regulated by intermittently short-circuiting or cutting out the resistor by means of electronic switching means. As a result, the effective resistance in the rotor circuit can be quickly changed, within wide limits, without it being necessary to change the ohmic resistance either by switches or by sliding contacts.

In practice, the electronic switching means will be in the form of controlled rectifiers, e.g., four-layer triodes, such as AEG-BTY 25, 100 A$_{average}$, 600 v.

Additional objects and advantages of the present invention will become apparent upon consideration of the following description when taken in conjunction with the accompanying drawings in which.

Figure 1:
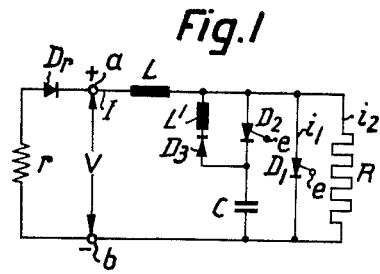
FIGURE 1 is a circuit diagram of one embodiment of the present invention.

Referring now to the drawing and to FIGURE 1 thereof in particular, the same shows a circuit according to the present invention by means of which the process according to the instant invention can be carried out. The circuit has input terminals $a$, $b$, across which is applied a direct current voltage v. derived from the rotor voltage appearing across the rotor resistance $r$ and rectified by means of a rectifier $D_r$ which may be a non-controlled rectifier diode. The circuit includes, in addition to a choke L connected to terminal $a$, a resistance R and a parallelly connected first rectifier $D_1$, the current through the last-mentioned rectifier and the resistance being indicated as $i_1$ and $i_2$, respectively. Connected across rectifier $D_1$ is a further circuit for intermittently rendering the rectifier $D_1$ conductive and non-conductive, thereby producing alternate periods during which the current I produced by the rectified voltage v. is permitted to flow through the resistance R and periods during which the current can not flow through the resistance. The latter periods occur when the rectifier $D_1$ is conductive, thereby effectively short-circuiting the resistance R. This further circuit comprises a rectifier $D_2$ and a capacitor C, there being across the rectifier $D_2$ a series-circuit composed of a further choke L' and a third rectifier $D_3$. The rectifiers are preferably of the semiconductor type, with rectifiers $D_1$ and $D_2$ being controlled rectifiers whose control electrodes are indicated at $e$, while rectifier $D_3$ may be a diode.

So long as the semiconductor rectifiers $D_1$ and $D_2$ are blocked, i.e., are in non-conductive condition, the current $i_2$ flowing through the resistance R will also be the total current I. If the rectifier $D_1$ is now rendered conductive, the resistance R is substantially short-circuited, so that there will now flow through the circuit a much larger current I which, for all practical purposes, is a maximum current limited only by the resistance $r$ of the rotor winding. As a result of this increased rotor current, the rotor will, with a given torque, assume a greater speed. If the rectifier $D_1$ is thereupon once again rendered non-conductive, the current I will be reduced to its original minimum value and the motor will slow down to its previous speed. If the rectifier $D_1$ is alternately rendered conductive and non-conductive at a sufficiently high frequency, the current I will assume a value that is somewhere between the above-described maximum and minimum values. The effective resistance $R_{eff}$ can then be expressed mathematically as follows:

$$R_{eff} = \tau \cdot R \text{ where } \tau = \frac{T_2}{T_1 + T_2}$$

with $T_1$ being the duration of the current flow through the rectificer $D_1$ and $T_2$ being the duration of the current flow through the resistance R. The choke L serves to keep the current I substantially constant, i.e., the choke acts to smooth out the current ripples which the action of the rectifier $D_1$ tends to produce, so that the current I will, in practice, be relatively free of harmonics. As a result, the current in the rotor winding has a substantially sinusoidal shape, in that the current will have the wave shape well known in the rectifier art which, in theory, is square and, with increasing number of phases, approaches a sinusoidal configuration.

FIGURE 1 shows how the main rectifier $D_1$ can, in conventional manner, be intermittently rendered conductive and non-conductive by means of the capacitor C, the controller rectifier $D_2$, the diode rectifier $D_3$, and the charge changing choke L'. The effective resistance $R_{eff}$ of the circuit of FIGURE 1 can be varied between O and R. In practice, R will be approximately 5 to 10 times the rotor resistance $r$, so that, in accordance with the theory of operation of asynchronous motors, the controllable speed and torque ranges are very substantial.

Figure 2:
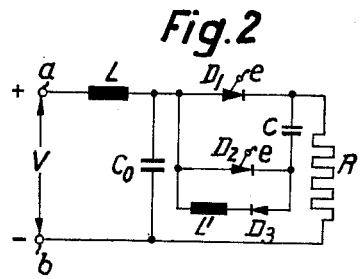
FIGURE 2 is a circuit diagram of another embodiment of the instant invention.

FIGURE 2 shows a circuit arrangement by means of which even larger effective resistances $R_{eff}$ can be obtained. This circuit differs from that of FIGURE 1 in that the main diode $D_1$ is connected in series with resistance R, so that the effective resistance will be $$R_{\text{eff}} = \frac{R}{\tau}$$

with $$\tau = \frac{T_2}{T_1 + T_2}$$

where $T_2$ is, as before, the duration of the current flow through the resistance R, and $T_1$ is what is now more accurately defined as being the duration of the interval during which no current flows through R. In this circuit, the effective resistances can be varied between R and infinity. The capacitor $C_0$ is required in order to suppress an overvoltage when the rectifier $D_1$ is non-conductive. The higher the frequency with which the state of conductivity of the rectifier $D_1$ is varied, the lower can be the capacitance of capacitor $C_0$. If the rectifiers are constituted by modern four-layer triodes having low deionization times, the switching frequency can easily be of the order of several kilocycles.

Figure 3:
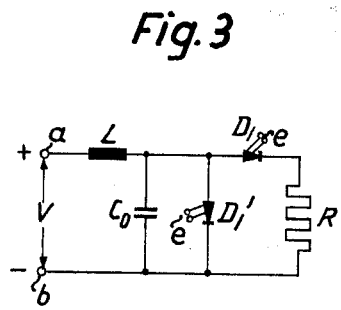
FIGURE 3 is a circuit diagram of yet another embodiment of the present invention.

FIGURE 3 shows how the circuits of FIGURES 1 and 2 can be combined with each other. The circuit for rendering the rectifier $D_1$ non-conductive is not shown, but is represented symbolically by a second control electrode $e$. For obtaining small effective resistances $$(0 \leqslant R_{\text{eff}} \leqslant R)$$

the rectifier $D_1'$ is intermittently rendered conductive and non-conductive by means of the circuitry shown in FIGURE 1, while for obetaning large effective resistances $(R \leqslant R_{\text{eff}} \leqslant \infty)$, the diode $D_1'$ is kept non-conductive and $D_1$ is intermittently rendered conductive and non-conductive.

The control electrodes or grids of the rectifiers $D_1$ $D_1'$, $D_2$, can be connected, for example, to a suitable logic circuit which, in turn, is connected to a suitable control device in such a manner that the rotor current will be adjusted to certain predetermined values or that the rotational speed of the motor, with given external moments of rotation, assumes certain desired values. In the latter case, the actual rotational speed of the motor can be measured by means of a tachometer.

Figure 4:
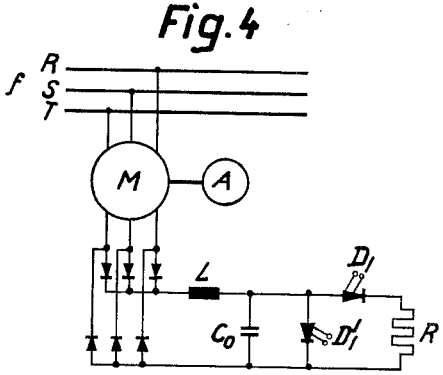
FIGURE 4 is a circuit diagram showing the circuit of FIGURE 3 in combination with an asynchronous motor.

FIGURE 4 shows how the arrangement of FIGURE 3 can be connected to control or regulate the rotor circuit of an asynchronous motor M, the motor being electrically connected to a three-phase power supply RST having a frequency $f$ and mechanically connected to a machine A, such as an elevator drive or crane.

If the choke L is sufficiently large, it will, in the case of six-pulse rectification such as depicted in the bridge circuit of FIGURE 4, produced in the rotor sections blocks of current having a duration of 120°. The stator will therefore also take out of the power supply current blocks of 120°. If, particularly in the case of relatively large power outputs, it is sought to make this current approach a substantially sinusoidal configuration, it will be necessary to use rectifier circuits havhing a higher number of phases. To do this, the rotor can be wound with a larger number of phases, and, in order to avoid a correspondingly large number of slip rings, the rectifier elements can be mounted on the rotor or motor shaft for rotation therewith, so that only the two direct current lines have to be taken off the shaft via slip rings. The rectifier elements can be uncontrolled silicon diodes. Instead, the rotor can be supplied from the net and the stator winding can be wound to include the requisite number of phases and be provided with a rectifier having the corresponding number of phases.

The present invention can also be used to cause the asynchronous motor to rotate at a given speed when the motor is used as a generator, or when it is used as a counter-current brake, because it is always possible to change the effective resistance of the rotor, within wide ranges, by changing the ratio of the interval during which current flows through the resistance R to the interval during which no current flows through this resistance. If this is done my means of electronic circuit elements such as are shown in FIGURES 1 to 4, the ratio can be changed exceptionally rapidly so that the circuit as a whole serves as a very effective speed control. Similarly, the circuit can be used to obtain exceedingly constant motor speeds. The resistance R will have to be selected such that the circuitry of FIGURE 1 can be used; if the resistance is too large, the voltage produced upon blocking of rectifier $D_1$ will be too large. As previously stated, the resistance R should be a multiple of the rotor resistance $r$. The rectifiers can be constituted by germanium or silicon rectifiers because such rectifiers will, in the pass direction, cause a very small voltage drop. If even this voltage drop is considered too large, the resistance can be short-circuited by a mechanical relay when the motor is rotated at full sped. Such a short-circuiting relay can also be connected in parallel with rectifier $D_1$ or with capacitor $C_0$ if, upon a steady current through the rectifiers, the latter are to be freed from having a current flow therethrough. If the direction of rotation of the motor is to be reversed by exchange of two stator phases, the polarity of the rectifier does not have to be inverted.

The net voltage applied to the motor can also be regulated or controlled if the circuits of FIGURES 1 to 3 are connected to the neutral point of a Y-connected stator winding. Such an arrangement, however, has the drawback that, if there are but few rectification phases, the harmonics of the stator current will produce more distortion of the rotary flux in the motor and will therefore produce more losses. But the advantage of such an arrangement is that the rectifier operates at the constant frequency of the supply net.

Under certain circumstances it is also possible to use, in place of a purely ohmic resistance, an impedance having an inductive component. In this case, a free-running or relaxation diode has to be connected across the resistance in order to prevent overvoltages. For the same reason, it is desirable, in the case of a purely ohmic resistance, to keep the inductance of the leads as small as possible.

Under other circumstances, the resistance can be an impedance having a capacitative component, in which case the extinguishing circuit for rectifier $D_1$ shown in FIGURES 1 and 2, can be replaced by other switching means, as, for example, circuits which use, in lieu of the diode $D_2$, saturation chokes with controlled pre-excitation. Moreover, the change of charge on the capacitor C can be effected by means other than the diode $D_3$ and choke $L'$, without changing the basic operation of the invention. Under certain circumstances, even the choke L can be eliminated, as, for example, if the rectification is carried out by means of a large number of phases or when the rotor current I is to be regulated very quickly.

Alternatively, it is possible to use, in place of the resistance R, an accumulator-type battery which is cut off by a reverse current diode, if it is expedient to use the energy of the accumulator for other purposes. By using such a battery, it is possible to control the rectifiers $D_1$ and $D_1'$ in such a manner as to regulate the charging current to the desired values despite fluctuations in the voltage across the rectifier. In installations using several asynchronous motors, such as a drive system for loading cranes, a single accumulator common to the motors may be used, which battery can then also be used to energize auxiliary accessories or D.C. motors; if desired, the energy of the accumulator can be fed back into the polyphase net by means of a common rectifier.

It is also possible to control or regulate the rotor current by controlling the rectifiers in the rotor circuit. Such an arrangement would require many controllable rectifiers; in cases where the control is to be carried out throughout a large angle, there would also have to be a suitable choke to avoid current distortion. The response of such an arrangement would be slower than that of a circuit according to the present invention, particularly at low slip frequencies, that is to say, at the full speed of the asynchronous motor.

Figure 5:
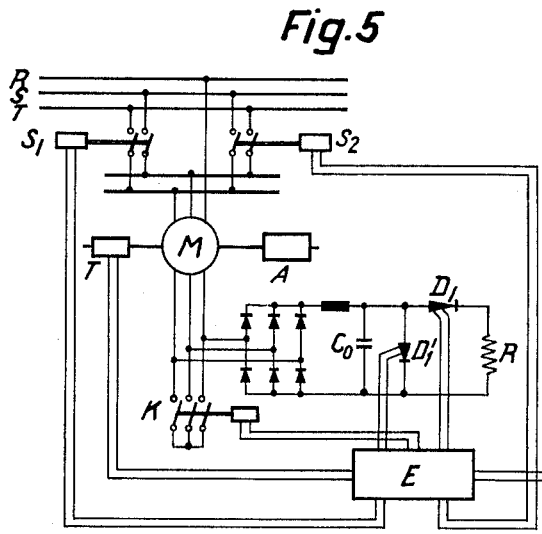
FIGURE 5 is a complete schematic diagram showing the circuit of FIGURE 3 in combination with a polyphase motor.

FIGURE 5 is a complete circuit diagram of a controlled asynchronous motor which is mechanically coupled to a machine A. The stator of the motor is connected to the current mains RST via two direction-reversing relays $S_1$ and $S_2$ so that, depending on which of these two relays connects the motor to the current mains, the motor will rotate in one direction or the other. The motor shaft drives a dynamo-type tachometer T which produces an output voltage representative of the actual rotational speed of the motor, this voltage being fed to a regulator E which, per se, is conventional and may be of the type shown in U.S. Patent No. 2,501,361. The conductivity state of the rectifiers $D_1$ and $D_1'$ will be controlled by the regulator E, i.e., the instants at which these diodes are rendered conductive and non-conductive will be given by pulses emanating from the regulator, and this occurs according to the ratio of the actual rotational speed, as given by the tachometer T, to the speed at which the motor is supposed to rotate. This last-mentioned speed is set by means of a setting member S.

If the direction of rotation of the motor is to be changed, this is likewise effected by the regulator E which will then give appropriate command signals to th switching relays $S_1$ and $S_2$. Moreover, during prolonged steady-state operation while the motor operates at maximum speed, a short-circuiting relay K may be switched in, possibly after a given time delay, so that no current will flow through the rectifiers. Also shown is a capacitor $C_o$ for suppressing overvoltages.

In lieu of a single resistor R, two different fixed resistors can be used which are short-circuited and switched off by means of controllable semiconductor diodes, thereby increasing the over-all range throughout which different values for $R_{eff}$ can be obtained without producing overvoltages.

According to another feature of the present invention, the rectified D.C. voltage derived from the rotor is applied to a stator winding for purposes of braking the motor. The winding can be one that is specially provided for this purpose, or it can be a winding which is already part of the motor.

The circuits according to the present invention are, of course, not limited for use with asynchronous motors whose speed is to be regulated, but can be used whenever the effective resistance $R_{eff}$ of a fixed resistance is to be varied quickly and within wide limits.

It will be understood that the above description of the present invention is susceptible to various modifications, changes, and adaptations, and the same are intended to be comprehended within the meaning and range of equivalents of the appended claims.

What is claimed is:

1. In combination with an asynchronous motor having a rotor winding and a rectifier for rectifying the voltage across siad rotor winding, a control circuit for controlling the speed of said motor, said control circuit comprising in combination: a resistance connected across said rectified voltage; and electronic switching means connected to said resistance for producing alternating periods during which said resistance is short-circuited and periods during which said resistance is not short-circuited, whereby there is obtained an effective resistance which is a function of the ratio of the lengths of the different periods and consequently a rotor current which is likewise a function of said ratio, thereby to control the speed of said motor, said switching means comprising a first controlled rectifier connected in parallel across the resistance, a second controlled rectifier connected in series with the resistance, and means for intermittently changing the states of conductivity of said rectifiers.

2. In combination with an asynchronous motor having a rotor winding and a rectifier for rectifying the voltage across said rotor winding, a control circuit for controlling the speed of said motor, said control circuit comprising in combination: a resistance connected across said rectified voltage; and electronic switching means connected to said resistance for producing alternating periods during which said resistance is short-circuited and periods during which said resistance is not short-circuited, whereby there is obtained an effective resistance which is a function of the ratio of the lengths of the different periods and consequently a rotor current which is likewise a function of said ratio, thereby to control the speed of said motor, said switching means comprising at least one semiconductor controlled rectifier and means for intermittently changing the state of conductivity of said rectifier.

3. A control circuit as defined in claim 2 wherein said rectifier is connected in parallel across the resistance, whereby when said rectifier is non-conductive, current will flow through the resistance whereas when said rectifier is conductive, the resistance is short-circuited so that no current will flow therethrough.

4. A control circuit as defined in claim 2 wherein said rectifier is connected in series with the resistance, whereby when said rectifier is conductive, current will flow through the resistance whereas when said rectifier is non-conductive, no current will flow through the resistance.

5. A control cricuit as defined in claim 2 wherein said means for intermittently changing the state of conductivity of said rectifier comprise a series-circuit composed of a capacitor and a second controlled rectifier connected across said first-mentioned rectifier and a further series-circuit composed of a third rectifier and a choke connected across said second rectifier.

6. A control circuit as defined in claim 2, further comprising means operatively associated with said electronic switching means for maintaining the motor speed constant despite fluctuations in the moment of rotation.

7. The combination defined in claim 2, further comprising a braking winding mounted on the stator of the motor and connectible to said rotor winding.

References Cited by the Examiner

UNITED STATES PATENTS

| | | | |
|---|---|---|---|
| 2,501,361 | 3/1950 | Taylor | 318—237 |
| 2,924,765 | 2/1960 | Lee | 318—237 |
| 2,978,630 | 4/1961 | DeLaTour | 323—22 |
| 3,024,401 | 3/1962 | Dinger | 318—327 |
| 3,064,174 | 11/1962 | Dinger | 318—331 |
| 3,066,250 | 11/1962 | Sogni | 318—237 X |

ORIS L. RADER, *Primary Examiner.*

SAMUEL GORDON, *Assistant Examiner.*